United States Patent [19]
Morrow, Sr.

[11] 4,391,477
[45] Jul. 5, 1983

[54] QUICK RELEASE MOUNTING FOR A TURNTABLE BEARING
[75] Inventor: James G. Morrow, Sr., Manitowoc, Wis.
[73] Assignee: The Manitowoc Company, Inc., Manitowoc, Wis.
[21] Appl. No.: 327,883
[22] Filed: Dec. 7, 1981
[51] Int. Cl.³ ............................................. F16C 19/10
[52] U.S. Cl. ................................................... 308/221
[58] Field of Search .............. 212/221, 222, 223, 230, 212/231, 137, 247, 248

[56] References Cited
U.S. PATENT DOCUMENTS

| 2,417,567 | 3/1947 | Ray | 308/222 |
|---|---|---|---|
| 2,545,122 | 3/1951 | Thompson | 308/221 |
| 3,075,614 | 1/1963 | Grundon | 308/221 |
| 3,861,243 | 1/1975 | Fleischer et al. | 212/247 |

Primary Examiner—Lenard A. Footland
Attorney, Agent, or Firm—Leydig, Voit, Osann, Mayer & Holt, Ltd.

[57] ABSTRACT

A turntable bearing device having a quick release mounting including inner and outer ball bearing races with the inner race fixed to the lower works and the outer race is detachably connected to the upper works of a load handling device. Gear teeth are provided along the inner circumference of the inner race to engage a pinion gear of the upper works. The quick release feature includes an arcuate beam which is slidably carried on support rails and engages the outer bearing race on one side while a latching means is provided to engage the outer bearing race on its opposite side. The arcuate beam and the latching means prevent rocking or tipping motion of the upper works during machine operation as well as providing the quick release means.

9 Claims, 7 Drawing Figures

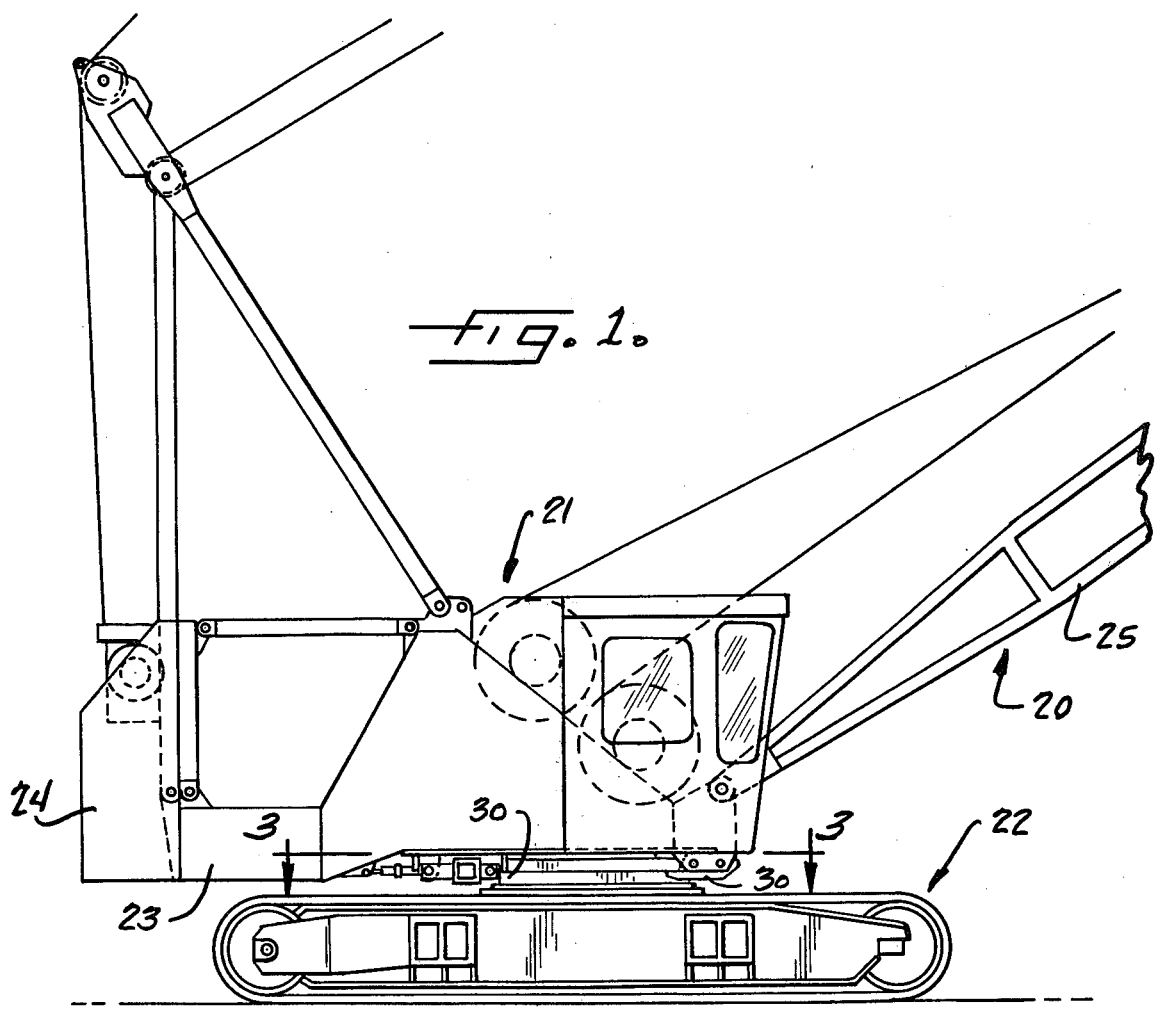
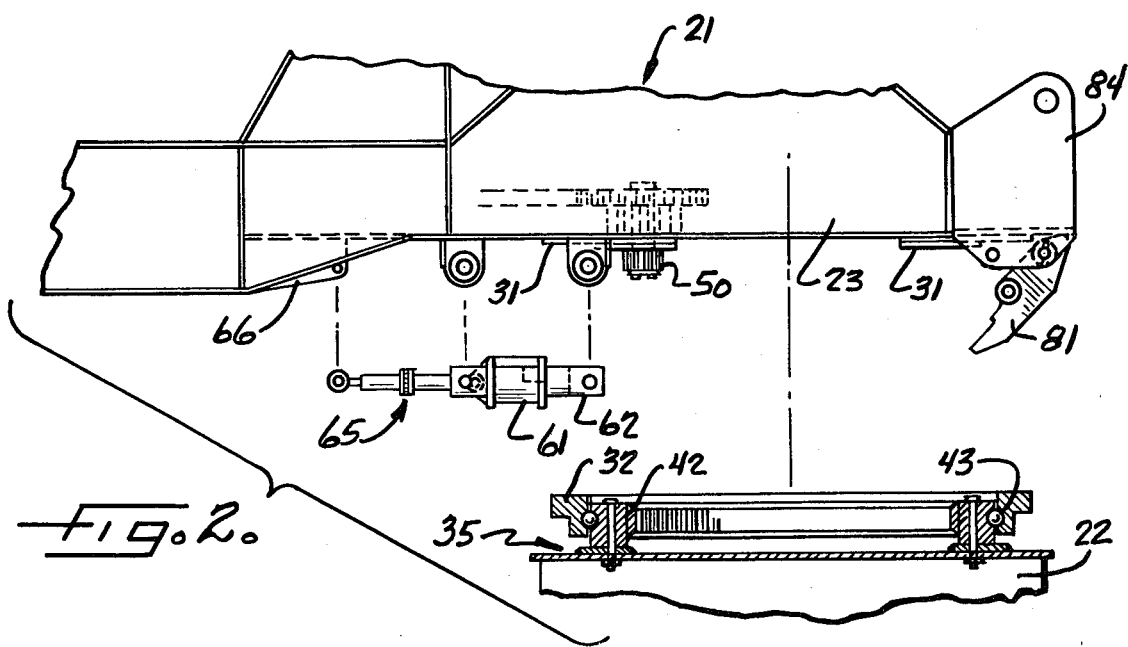

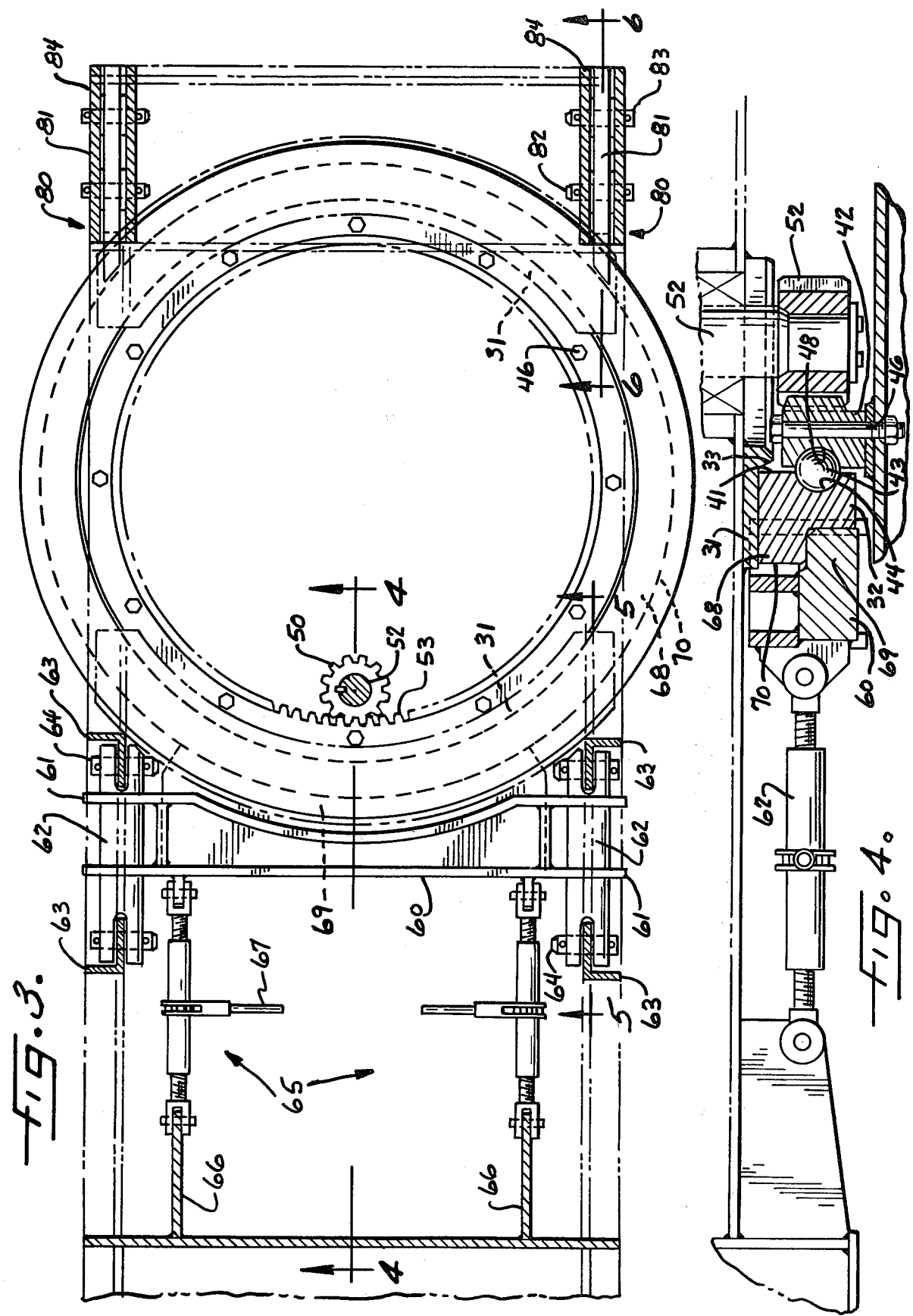

QUICK RELEASE MOUNTING FOR A TURNTABLE BEARING

FIELD OF THE INVENTION

This invention relates generally to load handling devices and more particularly concerns a turntable bearing device which incorporates a quick release means for convenient assembly and disassembly.

BACKGROUND OF THE INVENTION

Load handling devices, especially heavy load carrying devices such as lift cranes and the like, are commonly provided with a turntable supporting a rotatable bed upon which upper works are mounted. Typically the upper works include inter alia a boom, a back hitch assembly, an equalizer assembly, rigging, and the load line as well as an offsetting counterweight. In the main, the forces created when lifting a load are offset by the action of the counterweight; however, the constant loading and unloading action creates tipping moments which must be absorbed by the turntable mechanism.

In the past attempts have been made to offset the tipping moments imparted to the rotatable bed as described above by utilizing load supporting rollers as well as hook rollers. One example of a rotatable bed with its corresponding roller assembly is more fully described in U.S. Pat. No. 3,989,325.

SUMMARY OF THE INVENTION

The present invention offers several advantages over the existing art in that it effectively counteracts the induced tipping moments and provides a quick release means for disassembly. The invention discloses an upper works which is carried by a rotatable bed. Arcuate centering plates are secured to the bottom of the rotatable bed and, when the crane is assembled, are in frictional engagement with the upper surface of an outer bearing race of the turntable mechanism. The outer bearing race is rotatably mounted relative to a stationary inner bearing race by means of ball bearings interposed in annular grooves of the respective bearing races. Preferably there are gear teeth along the inner circumferential surface of the inner race and, a pinion gear, supported by the rotatable bed, engages these gear teeth to provide swing movement.

During crane operation, the continual lifting of loads creates tipping moments in the rotatable bed. To counteract this effect an acruate beam and clamping latches are provided. The arcuate beam engages the outer race of the turntable bearing on one side while the clamping latches engage the outer race diametrically opposite the arcuate beam. The arcuate beam and clamping latches resist the tipping moments transmitted to the outer race and prevent the occurrence of rocking, which could be hazardous. Additionally, both the arcuate beam and the clamping latches can be easily disengaged from the outer race so that the rotatable bed can be separated from the lower works to facilitate transport to another job site.

OBJECTS OF THE INVENTION

It is an object of this invention to incorporate a quick release system for the rotatable bed of a lift crane to reduce the time necessary to disassemble the crane and move it from one job site to another.

It is another object to provide a simplified means of counteracting the tipping moments created in the turntable during crane operation.

It is a further object of the present invention to provide an improved turntable bearing assembly capable of withstanding the tremendous side loads emparted when the crane is in operation.

Other objects and advantages of the invention will become apparent upon reading the following detailed description and upon reference to the drawings, in which:

BRIEF DESCRIPTION OF THE DRAWINGS

FIG. 1 is a fragmentary side elevation, partially schemmatic, of a load handling device in the form of a lift crane which embodies the rotatable bed and quick release features of the present invention;

FIG. 2 is a fragmentary, exploded side view, partially in section of the rotatable bed, quick release arcuate beam and clamping latch of the present invention, as well as the inner and outer turntable bearing races supported by the lower works;

FIG. 3 is a view taken substantially along line 3—3 in FIG. 1, showing the inner and outer races, the arcuate beam engaging the outer race, and the clamping latch assembly also engaging the outer race;

FIG. 4 is an enlarged partial cross-sectional view taken substantially along line 4—4 in FIG. 3, illustrating the engagement of the arcuate beam with the supporting flange of the outer bearing race;

Figure 5:
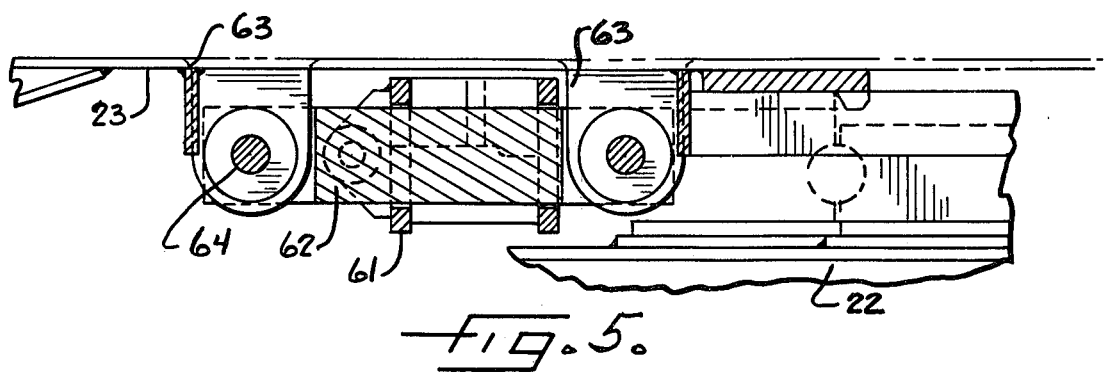
FIG. 5 is an enlarged partial cross-sectional side view taken substantially along line 5—5 in FIG. 3, illustrating the mounting means for the arcuate beam.

While the invention will be described in connection with a preferred embodiment, it will be understood that I do not intend to limit the invention to that embodiment. Rather, I intend to cover all alternatives, modifications and equivalents as may be included within the spirit and scope of the invention as defined by the appended claims.

DETAILED DESCRIPTION OF THE INVENTION

Turning now to the drawings, FIG. 1 shows a load handling device in the form of a crane assembly 20 to which the present invention relates. The crane assembly is comprised of an upper works 21 which is rotatably supported on a movable lower works 22. The upper works 21 includes a rotatable bed 23 which supports a counterweight 24 and a pivotally mounted boom 25 which are instrumental in producing the tipping moments which will be discussed below.

The rotatable bed 23 provides the means for support for the entire upper works 21 and is shown generally in FIG. 2. It can easily be seen that because the rotatable bed 23 carries all of the components of the upper works, all of the loads created by the action of the boom 25 and the corresponding counterweight 24, are imparted directly to the rotatable bed 23.

Pursuant to the present invention, means are provided for a quick release mechanism 30 between the upper works 21 and lower works 22 to permit quick and easy assembly and disassembly thereof. In the illustrated embodiment of the present invention, arcuate centering plates 31 are rigidly fastened to the bottom of the rotatable bed 23 to evenly distribute the aforementioned loads, and to provide a support means for the rotatable bed as it rides atop an outer bearing race 32 of a turntable bearing 35. The centering plates 31 can be secured to the rotatable bed 23 by any suitable means, such as by welding or bolts. Further, the centering plates 31 have a chamfered edge 33 which engages the inner circumferential edge 41 of the outer bearing race 32 of the turntable 35. As the bed 23 rotates during normal operation, the engagement of the chamfered edge 33 with the inner circumferential edge 41 of the outer bearing race 32 prevents misalignment or shifting of the rotatable bed 23.

Turning to FIG. 4, the turntable bearing assembly 35 is shown supporting the rotatable bed 23 and the upper works 21. In particular, the outer bearing race 32 and the arcuate centering plates 31 are in frictional mating relationship to each other. That is, the arcuate centering plates 31 which are rigidly fastened to the rotatable bed 23, merely rest atop the outer bearing race 32.

In keeping with one of the principle objects of the invention, an inner bearing race 42 is supported by the lower works 22 and is shown being fastened by bolts 46 thereto (FIGS. 3 and 4). The inner bearing race 42 remains stationary during operation of the crane assembly 20 and the corresponding rotational movement of the upper works 21. The inner bearing race 42 cooperates with the outer bearing race 32 by means of ball-type bearings 43 which are located in an outer bearing race annular groove 44 and an inner bearing race annular groove 48. As can be clearly seen in FIG. 4, the outer bearing race 32 is free to rotate in relation to the inner bearing race 42. All of the loading forces incurred by the upper works 21 are transmitted through the arcuate centering plate 31 and onto the outer bearing race 32, which in turn transmits these forces to the ball-type bearings 43 which are carried in the annular grooves 44 and 48. Thus, the loading forces are passed into the lower works 22 through the inner bearing race 42.

To swing the upper works 21, the rotatable bed 23 carries a pinion gear 50 which is keyed to a rotatable shaft 52 selectively driven by a power means (not shown) located on the upper works 21. The pinion gear 50 engages gear teeth 53 formed on the inner circumference of the inner bearing race 42. As the shaft 52 rotates it causes the pinion gear 50 to sequentially engage the gear teeth 53 of the inner bearing race 42 and causes the upper works 21 to rotate.

Figure 6:
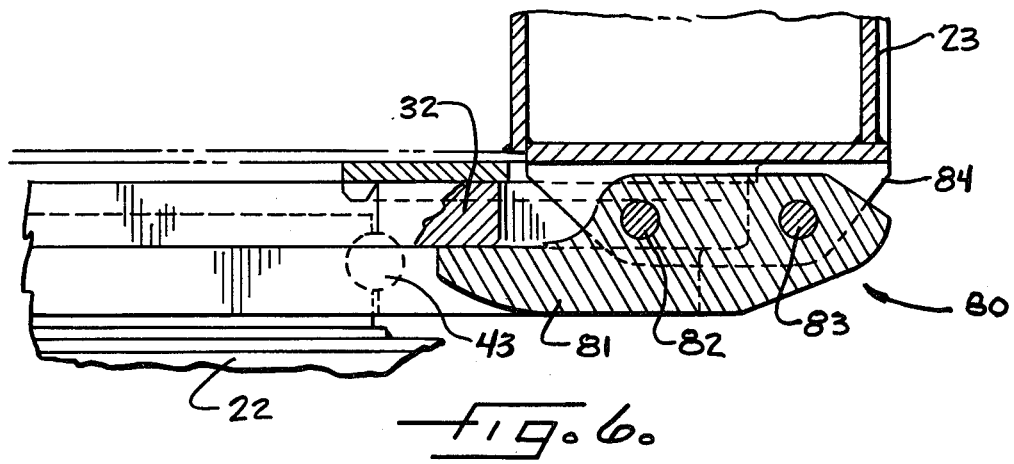
FIG. 6 is an enlarged cross-sectional side view taken substantially along line 6—6 in FIG. 3, showing the clamping latch as it engages the outer bearing race.
Figure 7:
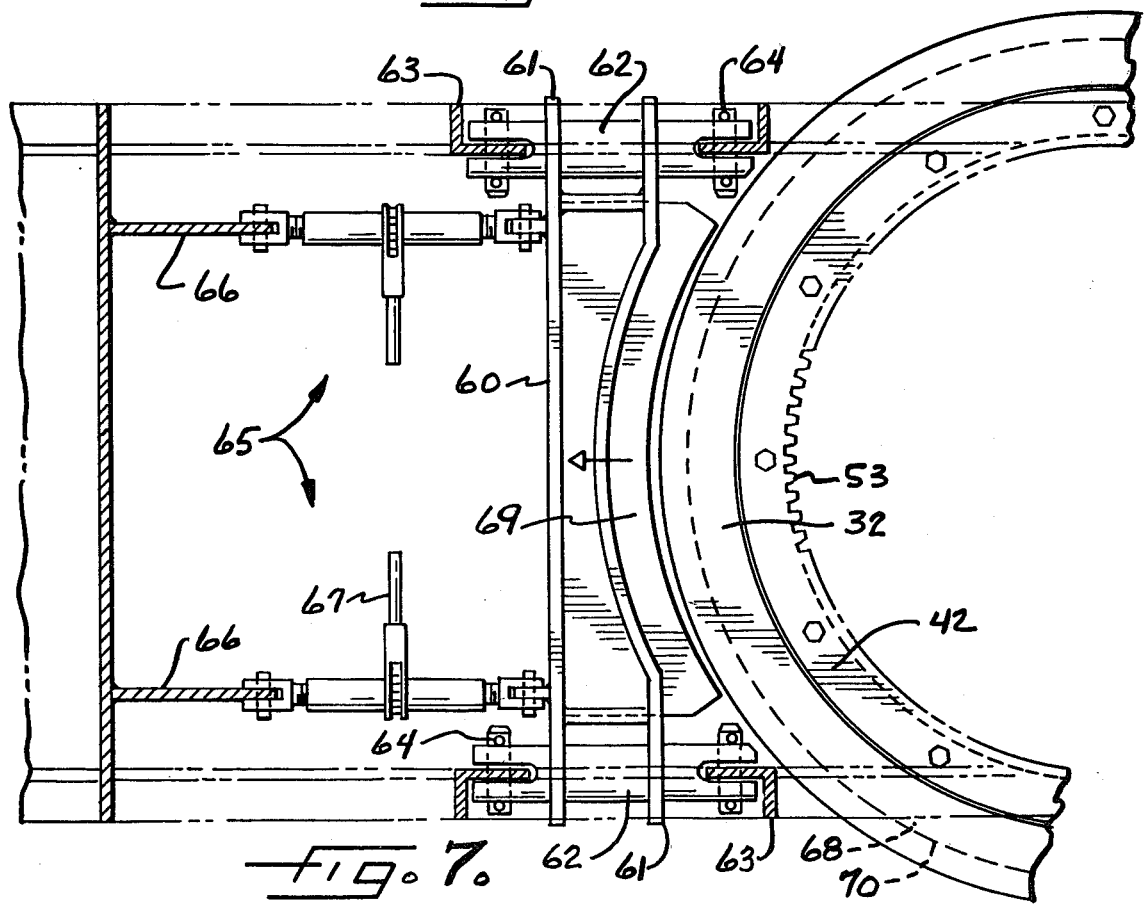
FIG. 7 is a fragmentary cross-sectional view similar to FIG. 3 showing the arcuate beam after it has been disengaged from the outer bearing race.

Although the outer bearing race 32, in cooperation with the inner bearing race 42, are adequately capable of carrying the upper works 21 and its associated loads, a means must be provided to counteract the tipping moments created during the crane operation. In accordance with one aspect of the invention this is accomplished by providing an arcuate beam 60 as shown in FIGS. 3 and 7, and a latching assembly 80 as shown in FIGS. 3 and 6 and more fully described below.

In the preferred embodiment, the arcuate beam 60 is supported at its ends 61 by cylindrical support rails 62. The support rails 62, however, may take other geometrical forms without departing from the spirit of the invention. The support rails 62 are detachably mounted to the rotatable bed 23 by means of brackets 63 which can be fastened to the bed by any conventional means, such as by welding. Locking pins 64 are provided to detachably secure the support rails 62 to the mounting brackets 63.

To slide the arcuate beam 60 axially along the support rails 62 a turnbuckle assembly 65 is provided. The turnbuckle assembly 65 is fastened at its one end to the arcuate beam 60 and at its other end to brackets 66 which are fastened to the rotatable bed 23 by any suitable means, such as by welding. The turnbuckle assembly 65 preferably incorporates a ratchet assembly 67 which provides a convenient means for shortening or lengthening the turnbuckle assembly to slide the arcuate beam 60 on support members 62.

In its extended position, the arcuate beam 60 as shown in FIG. 3, engages support flange 68 such that a support ledge 69 of the beam 60 directly abuts the outer face 70 of the flange 68. Preferably the flange 68 has chamfered edges, as does the support ledge 69 of the beam 60 so that the two parts may more easily slide together. In its fully extended position, the arcuate beam 60 prevents the rotatable bed 23, supported by the outer bearing race 32, from tipping or rocking when uneven loads are incurred by the rotatable bed 23. In addition to preventing the rocking or tipping motion, the arcuate beam 60 can be quickly retracted using the ratchet means 67, thereby allowing the removal of the rotatable bed 23 from the turntable bearing assembly 35 and the lower works 22.

Although the arcuate beam 60 provides a quick release means and tipping moment support, it does so only on one side of the outer bearing race 32. To provide similar functions, one or more latch assemblies 80 are diametrically opposed to the arcuate beam 60 on the outer bearing race 32. In the illustrated embodiment, there are a pair of latch assemblies 80 and, as shown in FIG. 6, each assembly includes a clamping latch 81 which engages the support flange 68 of the outer bearing race 32. By removing locking pin 82, the clamping latch 81 is free to pivot downwardly on pin 83. A support plate 84 is rigidly secured to the rotatable bed 23 and provides a means of support for the clamping latch 81. In its locked position the clamping latch 81 counteracts the rearward tipping moments cleared during crane operation.

With the arcuate beam 60 and the latch assemblies 80 diametrically opposed to each other on the outer bearing race 32 both the forward and rearward tipping moments imposed on the outer race are effectively absorbed resulting in a safer and more uniform mode of operation while also providing a means for quick and convenient assembly and disassembly.

When it is desired to move the crane assembly from one job site to another the arcuate beam 60 and the latch assembly 80 provide a means for quickly disassembling the rotatable bed 23 and the upper works 21 from the lower works 22. Utilizing the ratchet means 67 on the turnbuckle assembly 65, the arcuate beam 60 is retracted from engagement with the outer bearing race 32 and the latching assembly 80 is unpinned, thereby allowing the rotatable bed 23 to be easily removed from the lower works 22 merely by lifting it up. Accordingly, what used to take many man hours of disassembly is now reduced to a matter of minutes and a comparative amount of time can be saved during assembly by simply reversing the disassembly operation.

We claim as our invention:

1. A quick release mounting for a turntable bearing of a load handling device or the like comprising, in combination, upper works carried by a rotatable bed, arcuate plates fixedly secured to the bottom of the rotatable bed, a rotatable outer bearing race in engagement with the arcuate plates and providing support for the rotatable bed and upper works, a stationary inner bearing race fixed to a lower works and having gear teeth along its inner circumference, a rotatable pinion gear which engages said gear teeth, said outer bearing race being rotationally supported by the inner bearing race by ball bearings so that as the pinion gear rotates it causes the upper works to rotate along with the outer race relative to the inner race, an arcuate beam slidably mounted on the rotatable bed for engagement with the outer bearing race, means for moving the arcuate beam into and out of engagement with the outer race, a clamping latch pivotably mounted on the rotatable bed so that its one end engages the outer bearing race on the side of the outer race diametrically opposite the arcuate beam, said arcuate beam and clamping latch providing engagement with the outer race to counteract tipping moments of the upper works while at the same time providing for quick engagement and disengagement with the outer race.

2. A quick release mounting as defined in claim 1, wherein said arcuate centering plate includes a chamfered edge which engages one edge of the outer bearing race thereby forcing the rotatable bed into proper alignment with the bearing race during assembly and operation.

3. A quick release mounting as defined in claim 1, wherein said arcuate beam includes a support ledge on one edge engageable with the outer bearing race.

4. A quick release mounting as defined in claim 3, wherein said outer bearing race includes a support flange for direct engagement with the arcuate beam, said support flange having chamfered edges to facilitate slidable engagement with the support ledge of the arcuate beam.

5. A quick release mounting as defined in claim 1, wherein said clamping latch is pivotably attached to a mounting bracket on the rotatable bed and includes a pin extending through the latch and the bracket.

6. A quick release mounting as defined in claim 1 or claim 5, wherein said means for securing the clamping latch in place includes a locking pin extending through the clamping latch and a second bracket mounted to the upper works.

7. A quick release mounting as defined in claim 1, wherein said means for slidably moving the arcuate beam includes a turnbuckle assembly fastened at its one end to brackets extending from the upper works and fastened at its other end to the arcuate beam, said turnbuckle having a ratchet drive means for increasing or decreasing the distance between the respective ends of the turnbuckle assembly thereby causing a corresponding movement in the arcuate beam.

8. A quick release mounting as defined in claim 1, wherein said arcuate beam slides axially along support members which are detachably mounted to the rotatable bed by means of pins and brackets.

9. A quick release mounting as defined in claim 1, wherein said inner bearing race and said outer bearing race are each equipped with an annular groove for carrying ball bearings, the ball bearings being interposed between the respective annular grooves and providing support for the outer race which incurs the entire load component of the rotatable bed and the upper works.

* * * * *